United States Patent [19]
Perlman et al.

[11] Patent Number: 5,687,235
[45] Date of Patent: Nov. 11, 1997

[54] CERTIFICATE REVOCATION PERFORMANCE OPTIMIZATION

[75] Inventors: Radia J. Perlman, Acton, Mass.; Edwards E. Reed, Lindon; Tammy G. Carter, Pleasant Grove, both of Utah

[73] Assignee: Novell, Inc., Orem, Utah

[21] Appl. No.: 548,461

[22] Filed: Oct. 26, 1995

[51] Int. Cl.[6] .................................................. H04L 9/00
[52] U.S. Cl. ...................................... 380/25; 380/30
[58] Field of Search .................................. 380/25, 30

[56] References Cited

U.S. PATENT DOCUMENTS

| | | | |
|---|---|---|---|
| 5,261,002 | 11/1993 | Perlman et al. | 380/30 |
| 5,371,794 | 12/1994 | Piffie et al. | 380/30 |
| 5,418,854 | 5/1995 | Kaufman et al. | 380/30 |
| 5,481,613 | 1/1996 | Ford et al. | 380/30 |
| 5,535,276 | 7/1996 | Ganesan | 380/25 |

OTHER PUBLICATIONS

Technical Corrigenda to Rec. X.500/ISO/IEC 9594 resulting from Defect Reports 9594/128 by ISO/IEC JTC 1/SC 21/WG4 and ITU-T Q15/7 Collaborative Editing Meeting on the Directory, Ottawa, Canada, Jul. 1995.
Draft Amendments DAM 4 to ISO/IEC 9594-2, DAM 2 to ISO/IEC 9594-6, DAM 1 to ISO/IEC 9594-7, and DAM 1 and ISO/IEC 9594-8 on Certificate Extension by ISO/IEC 1/SC 21/WG4 and ITU-T Q15/7 Collaborative Editing Meeting on the Directory, Ottawa Canada, Jul. 1995.

Primary Examiner—Salvatore Cangialosi
Attorney, Agent, or Firm—Cesari and McKenna, LLP

[57] ABSTRACT

The present invention is an improved certificate revocation process that improves the efficiency of an authentication exchange in a public key distributed network system. Specifically, the present invention includes a novel revocation service (RS) that, in response to a unique request from a server node, selects certain revoked certificates from a current CRL to include in its reply so as to consume minimal system bandwidth. The unique request includes a number of parameters for consideration by the RS in generating its reply, including a maximum CRL size and/or a timestamp. The maximum CRL size indicates the largest number of revoked certificate serial numbers that the server node can process and thus receive in the revocation service reply, whereas the timestamp indicates the latest certificate revocation date of the certificates included in the CRL presently retained by the server node. Significantly, the RS generates an optimal CRL for its reply that contains all, part, or none of the current CRL revoked certificate serial numbers. Determination of the optimal CRL entails consideration of any number and combination of optimization factors, including the number of revoked certificates stored in the CRL storage facility and the time remaining before the current CRL is to be updated by a certificate authority (CA), the expiration date of the certificates, as well as the maximum CRL size and/or timestamp parameters provided to the RS in the server node request. The server node may control whether it will receive an optimal CRL and if so, what portion of the current CRL it will include by manipulating the parameters it provides to the RS. This enables each server node to request the CRL based upon its own specific security needs while optimizing the certificate revocation process. Further, the RS and/or server node may discard certificate serial numbers as their expiration dates come to pass.

32 Claims, 4 Drawing Sheets

CERTIFICATE REVOCATION PERFORMANCE OPTIMIZATION

FIELD OF THE INVENTION

The present invention relates generally to public key cryptography in distributed data processing systems and more specifically, to a means for efficiently revoking certificates.

BACKGROUND OF THE INVENTION

In a distributed data processing network system, the methodology employed to reliably verify the identity of a communicating device across the network prior to allowing the device access to system operations and resources is referred to as authentication. Access to the system resources may be, for example, for the purpose of communicating with other users, retrieving secure information, or receiving a service. Distributed network systems generally include various computer nodes interconnected by a communications medium. The computer nodes may include nodes that are directly accessed by users, e.g., workstations; and nodes running specialized applications, e.g., servers. These nodes, the processes running on these nodes, and the users of the distributed system are referred to as "principals." An authentication exchange is performed on behalf of the principals.

Public key cryptography is a method of secure communications in which each principal has a public encryption key and a private encryption key, and two principals can communicate knowing only each other's public keys. An encryption key is a code or number which, when taken together with an encryption algorithm, defines a unique transformation used to encrypt or decrypt data. A public key system may be used in such a way as to ensure confidentiality and/or integrity of the information being transmitted, i.e., to ensure that the information may not be understood by an eavesdropper, as well as to ensure the authenticity of the sender of the information.

The manner in which a public key cryptographic system operates to ensure authentication may be understood without reference to the mathematical transformations that are used for encryption and decryption. Public key cryptography is also referred to as "asymmetric" encryption became information encoded with a public key may be decoded only by using an associated private key, the associated public and private keys defining what is commonly referred to as a key pair. According to this type of encryption, the private key is known only to the owner of the key, while the public key is known to other principals in the distributed network system.

Accordingly, to effect a secure transmission of information to a recipient, a principal encodes ("encrypts") the information with the recipient's public key. Since only the intended recipient has the complementary private key, only that principal can decode ("decrypt") it. On the other hand, to prove to a recipient of information that the sender is who he purports to be, the sender encodes ("signs") the information with its private key. If the recipient can decode ("verify") the information, it knows that the sender has correctly identified itself. In public key cryptography, each principal is responsible for knowing its own private key and all the public keys are generally kept in a convenient location, typically a directory service (DS). Alternatively, each principal may store its own public key, furnishing it to a recipient during an authentication exchange.

It is essential to reliably know which public key belongs to which principal. The typical solution for this problem is to use a trusted entity known as a certificate authority (CA). A CA generates authentication certificates, which are signed messages specifying a user name and the corresponding public key. This verification of the relationship between the public key and the principal to which it belongs precludes an intruder from compromising the system by posing as a valid principal. Since each certificate is signed by the CA to ensure the authenticity of the certificate itself, all principals in the network that are required to authenticate a user must somehow securely learn the CA's public key so that they can verify its signature on the certificates. Certificates may be stored in any convenient location, such as a DS, or each node can store its own certificate and furnish it as part of the authentication exchange.

For complete network security, every principal must have a certificate. Sometimes, however, it is desirable to later deny a principal access to the network after a certificate has been issued. For example, a user's private key may be stolen, compromised or lost, or, in the case of an employer-employee relationship, the employee may be terminated. Under such circumstances, it is desirable to revoke the certificate's validity, thereby denying the user associated with that private key access to the network's operations and information.

One conventional approach to solving this problem is to issue an expiration date with the certificate. The expiration date defines a validity period from the certificate's date of issuance during which the associated principal may access the network. Upon expiration, a new certificate must be reissued for that principal. Reissuing certificates requires that the CA perform cryptographic processing for each certificate and that the renewed certificates be communicated to all principals that store them. A drawback to this approach is that the overhead of reissuing the certificates can be excessive when the validity periods are relatively short. To reduce the burden of reissuing certificates to valid users, the validity period may be extended. However, a system can be compromised within hours of, for example, an intruder learning of a valid user's private key. As a restfit, the validity periods must also be short enough to maintain the desired level of security in the network. These competing requirements are difficult to reconcile, particularly in systems having a large number of users.

To compensate for the limited applicability of certificate expiration dates, various schemes have been developed to revoke unexpired certificates. In one conventional approach, all valid user certificates are stored on-line in some location, such as a DS, and are publicly available for retrieval. For example, when a user needs to authenticate to a server, the server polls the DS to see if it contains the user's certificate. If a certificate is not stored in the DS, then it is concluded that the certificate has been revoked. A drawback of this approach is that each application must communicate with the DS on every certificate-checking operation. This can consume considerable bandwidth, particularly in systems requiring the authentication of a user whenever a resource is accessed.

Another conventional approach is to periodically issue a list of unexpired certificates that should not be honored, referred to as a Certificate Revocation List (CRL). The CRL has a format defined by the ITU-T Recommendation X.509, formally referred to as the ISO/IEC 9495-8: Information Technology-Open Systems Interconnection-The Directory-Authentication Framework, 1988 (revised 1993). An application considers a certificate as valid if it has not expired and is not listed in the CA's current CRL. As in the case of the public keys and certificates, CRLs may be presented by the certificate holders to principals with whom they wish to communicate, or may be stored in a public place, such as a DS. It should be noted that alternative approaches are available for publicly storing public keys, certificates, and CRLs on-line. The commonly used DS has been used to generally refer to any device that provides public, on-line access to these cryptographic elements.

The need to communicate with the DS during each access to a resource has been eliminated in systems implementing this approach became the CRL includes a complete list of revoked and unexpired certificates. However, once a CRL is downloaded, it is valid for a limited period of time, which is application dependent, based upon the application's security sensitivity. Thus, the CRL must be issued at the end of each validity period, or alternatively, it may be issued on demand. A drawback to these latter approaches is that the CRL is often a large file. Periodically issuing such a large file consumes considerable bandwidth over the network.

It can be seen from the foregoing that each of the conventional approaches to revoking unexpired certificates are appropriate in only certain circumstances and not others, oftentimes consuming considerable bandwidth over the network as conditions change. What is needed, therefore, is a flexible means for efficiently revoking certificates during an authentication process regardless of the size of the CRL or the frequency with which a principal must perform the authentication process.

SUMMARY OF THE INVENTION

The present invention is an improved certificate revocation process that improves the efficiency of an authentication exchange in a public key distributed network system. Specifically, the present invention includes a novel revocation service (RS) that, in response to a unique request from a server node, selects certain revoked certificates from a current CRL to include in its reply so as to come minimal system bandwidth.

The unique request includes a number of parameters for consideration by the RS in generating its reply, including a maximum CRL size and/or a timestamp. The maximum CRL size indicates the largest number of revoked certificate serial numbers that the server node can process, and thus receive in the revocation service reply, whereas the timestamp indicates the latest certificate revocation date of the certificates included in the CRL presently retained by the server node. Significantly, the RS generates an optimal CRL for its reply that contains all, part, or none of the current CRL revoked certificate serial numbers. Determination of the optimal CRL entails consideration of any number of optimization factors, including the number of revoked certificates stored in the CRL storage facility and the time remaining before the current CRL is to be updated by the certificate authority (CA), along with the maximum CRL size and/or timestamp parameters provided to the RS in the server node request. The server node controls whether it will receive an optimal CRL and if so, what portion of the current CRL it will include by manipulating the parameters it provides to the RS. This enables each serve node to request the CRL based upon its own specific security needs.

In a preferred embodiment, the RS determines the optimal CRL based upon the maximum CRL size as well as the size and an expected update time of the current CRL. For example, when the CRL is short and will not be updated by the CA in the near future, then the novel RS will provide the complete CRL to the serve node if it is less than or equal to the maximum CRL size that the server node can process. Here, the additional bandwidth consumed by sending the current CRL is less than the anticipated bandwidth consumed by the server node requesting the revocation status of additional certificates during the time remaining before the CRL is updated. On the other hand, when the CRL is long, or when the current CRL is expected to be updated shortly, then the RS will simply respond with the revocation status of a particular certificate, the serial number of which may be included in the request. In this latter case, the consumed bandwidth cannot be justified by the few anticipated revocation requests that are precluded by sending the complete current CRL.

In another preferred embodiment of the invention, the RS generates the optimal CRL containing only a portion of the current CRL. Determination of this "incremental" CRL is based upon the same factors as discussed in the above embodiment, as well as the timestamp date provided by the server node in its request. Here, the RS provides the server node with only the serial numbers of those certificates which have been revoked since the date indicated in the timestamp. The server node appends these serial numbers to the CRL it presently retains, resulting in a complete list of currently revoked certificates.

In yet another preferred embodiment of the invention, the timestamp date is considered in combination with the maximum CRL size in determining which portion of the current CRL to include in the incremental CRL. If the RS determines that the number of revoked certificates that it must provide to the server node is greater than the maximum CRL size, the RS provides incremental CRLs in successive replies, each including certificates that have revocation dates in successive date ranges. The server node continually appends the contents of each successive incremental CRL to attain a complete list of currently revoked certificates.

In the above embodiments wherein the optimal CRL contain an incremental CRL, the RS includes in its response a certificate expiration date that the CA provides with each certificate serial number. The expiration date is used by the server node to determine and retain only those certificate serial numbers pertinent to its security needs. For example, a server node may purge itself of serial numbers of revoked certificates that have expired. Alternatively, in any of the above embodiments, the RS may discard revoked certificates as they expire. Reducing the size of the current CRL will in mm reduce the size of the optimal CRL whether it includes all or part of the current CRL.

Further, alternative embodiments include consideration of additional factors to those specified above. For example, the RS may delay providing the above optimal CRL until there is little or no traffic over the network Advantageously, the present invention provides a flexible and efficient means for efficiently providing certificate revocation information to a verifying principal, thereby enabling the authentication process to consume minimal system bandwidth.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENTS

Figure 1:
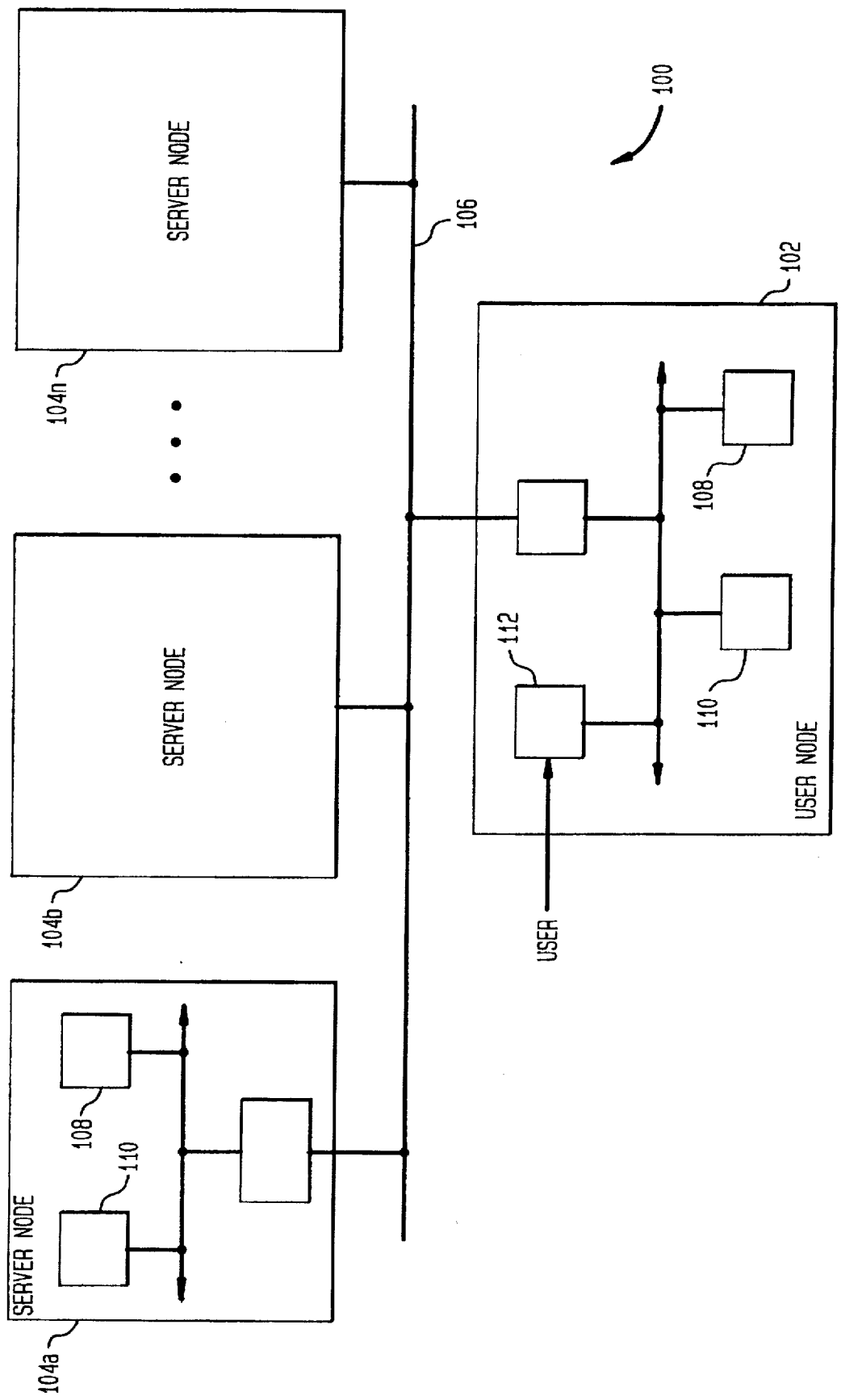
FIG. 1 is a diagram of a distributed data processing network system in which the apparatus and protocol of the invention may be used.

Referring to FIG. 1, a distributed, public key data processing network system 100 includes a plurality of computer nodes, such as a user node 102 and various server nodes 104a–n, interconnected by a communications medium 106. The user node, e.g., a workstation 102, is a computer generally configured for use by one user at a time, whereas each server 104 is a computer resource running specialized software applications, typically for use by many users. In general, each of the compute nodes includes memory means 108 for storing software programs and data structures associated with the cryptographic processes described herein. In addition, the nodes further include processor means 110 for executing the software programs, including various algorithms for generating messages associated with, e.g., the authentication of certificates. It will be apparent to those skilled in the art that other processor and memory means may be used within the teachings of the invention to implement the certificate authentication techniques described herein.

To access the server nodes 104 of the network 100, a user typically "logs in" to the local workstation 102 and then remotely authenticates itself to those nodes. Specifically, the user types an authorized name and password into an input/output device 112 of the workstation 102 and the workstation authenticates the login attempt using a login authentication exchange. Once authenticated, the user receives its private key, which the workstation 102 uses in subsequent authentication exchanges with remote principals, such as server nodes 104.

Figure 2:
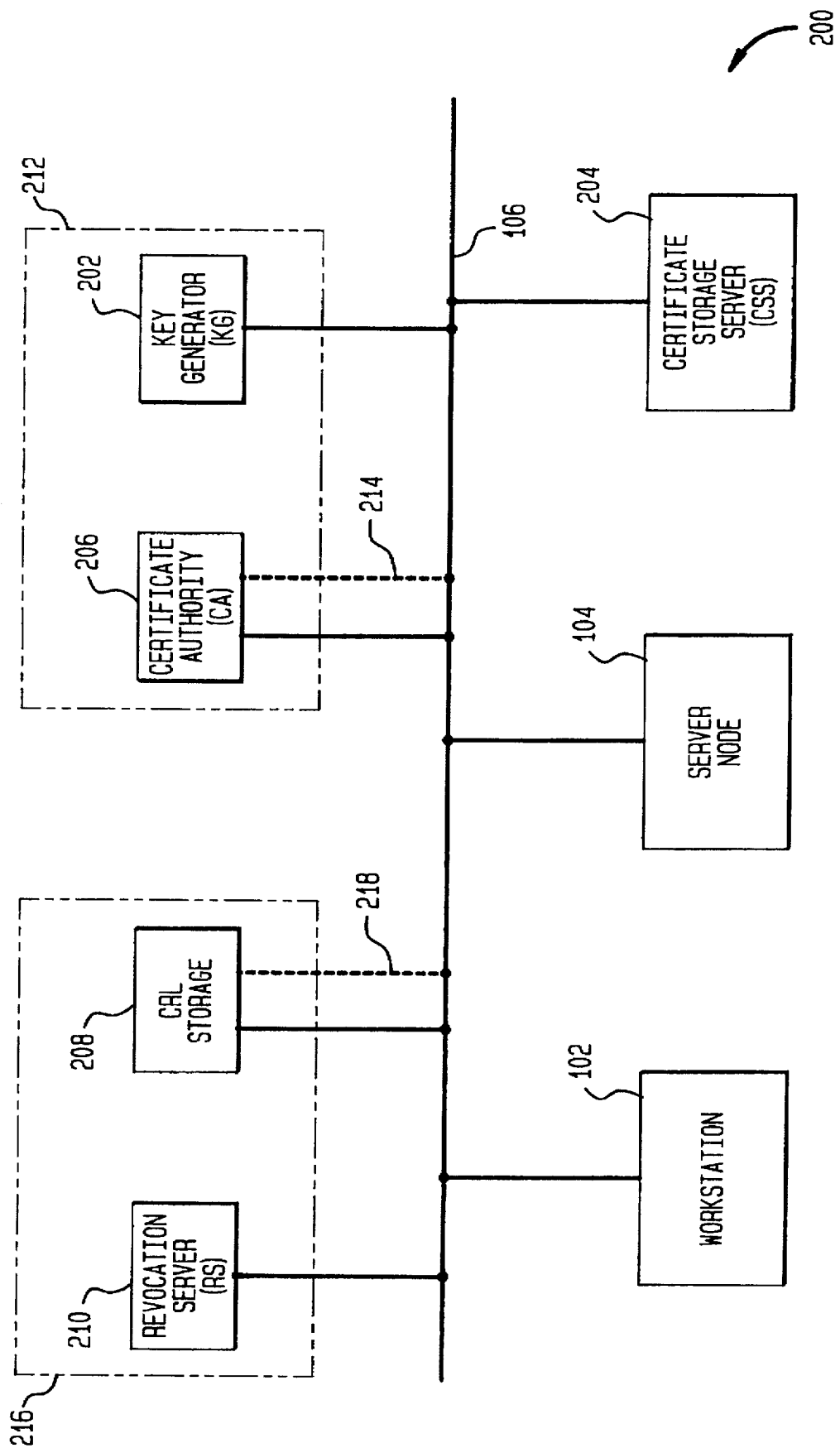
FIG. 2 is an exemplary embodiment of an authentication arrangement including a workstation node, a key generator (KG) node, a certificate authority (CA), a certificate storage server (CSS) node and a revocation service (RS) node in accordance with the invention.

An exemplary embodiment of the authentication arrangement of the present invention is shown in FIG. 2. The arrangement includes a key generator (KG) serve 202, a certificate storage server (CSS) 204, a certification authority (CA) 206, a certificate revocation list (CRL) storage facility 208, a novel revocation service (RS) 210, and one or more server nodes 104 configured in accordance with the present invention.

The KG 202 is a specialized server application used to register a user in the distributed system 200 by creating an account that includes the user's name and password. The KG 202 also creates a private/public RSA key pair for the user and, thus, must operate in a trustworthy fashion. That is, the KG must choose private/public key pairs at random and must either generate or accept from the users the keys or the passwords used to encrypt the private keys. In addition to reliably generating and encrypting the private keys, the trusted KG 202 is required to "forget", i.e., erase, the private keys. Further, in most implementation, the KG must reliably communicate the generated public key to certification authority 206, so that the CA may cryptographically bind the public key and the user name in a signed certificate. One way of securing the KG is to physically package it with the CA as shown by dashed box 212, and keep the combined node off the network when not in use, as illustrated by the dotted line 214.

The CSS 204 functions as a repository for storing and distributing the public key certificates generated by the CA. Became the stored certificates are signed by the CA, the CSS need not be a trusted authority. Typically, the CSS 204 is accessed during each certificate authentication exchange by a verifying principal to retrieve a signed certificate for use in the authentication process. In an alternative embodiment, network 200 does not include CSS 204. In this embodiment, CA 206 provides each principal with its respective signed certificate for presentation to other principals with whom they communicate.

As noted, the CA also determines which unexpired certificates should no longer be honored. The CA provides the serial number of these revoked certificates to the CRL storage facility 208 along with the effective date and time of the revocation and the scheduled expiration date of the certificate. The CRL storage facility stores the revoked certificate serial numbers in a current certificate revocation list (CRL). For each server node, the current CRL is considered valid for a predetermined period of time, referred to as the CRL validity period.

The RS 210 is a specialized server application that provides a verifying principal, such as server node 104, with certificate revocation information. In accordance with the present invention, the RS accesses the CRL storage facility to retrieve selected revoked certificate serial numbers for transmission to the verifying principal based upon parameters provided by that principal as well as other optimization factors described below with reference to FIGS. 3A and 3B. In addition, the RS may determine the revocation status of a particular certificate, the serial number of which is provided to the RS in a unique request from the requesting server node.

In accordance with the exemplary embodiment of the invention described herein, CRL storage facility 208 and RS 210 are combined into a single entity 216. However, in an alternative embodiment, CRL storage facility 208 may be a separate server node independently connected to network 106 as indicated by dotted line 218. Ideally, the RS should be on-line to enable verifying principals to communicate with it; additionally, the RS should be a trusted entity to avoid compromise. In the absence of these requirements, an intruder may compromise the RS. For example, an intruder may delete a revoked certificate's serial number from the CRL storage facility 208 or an intruder may configure the RS to always reply with a revocation status indicating that a certificate has not been revoked, regardless of its actual status. Moreover, the RS should reside in a physically secure node configured with "masted" software, i.e., limiting the functions it performs to, ideally, only providing the revocation service and minimizing the number of replicas of it in the network. In the preferred embodiment, the RS includes a private key with which to sign responses to requesting nodes. Storing the signatures with the RS's response ensures the integrity of the CRL information stored by the requesting node.

Figure 3A:
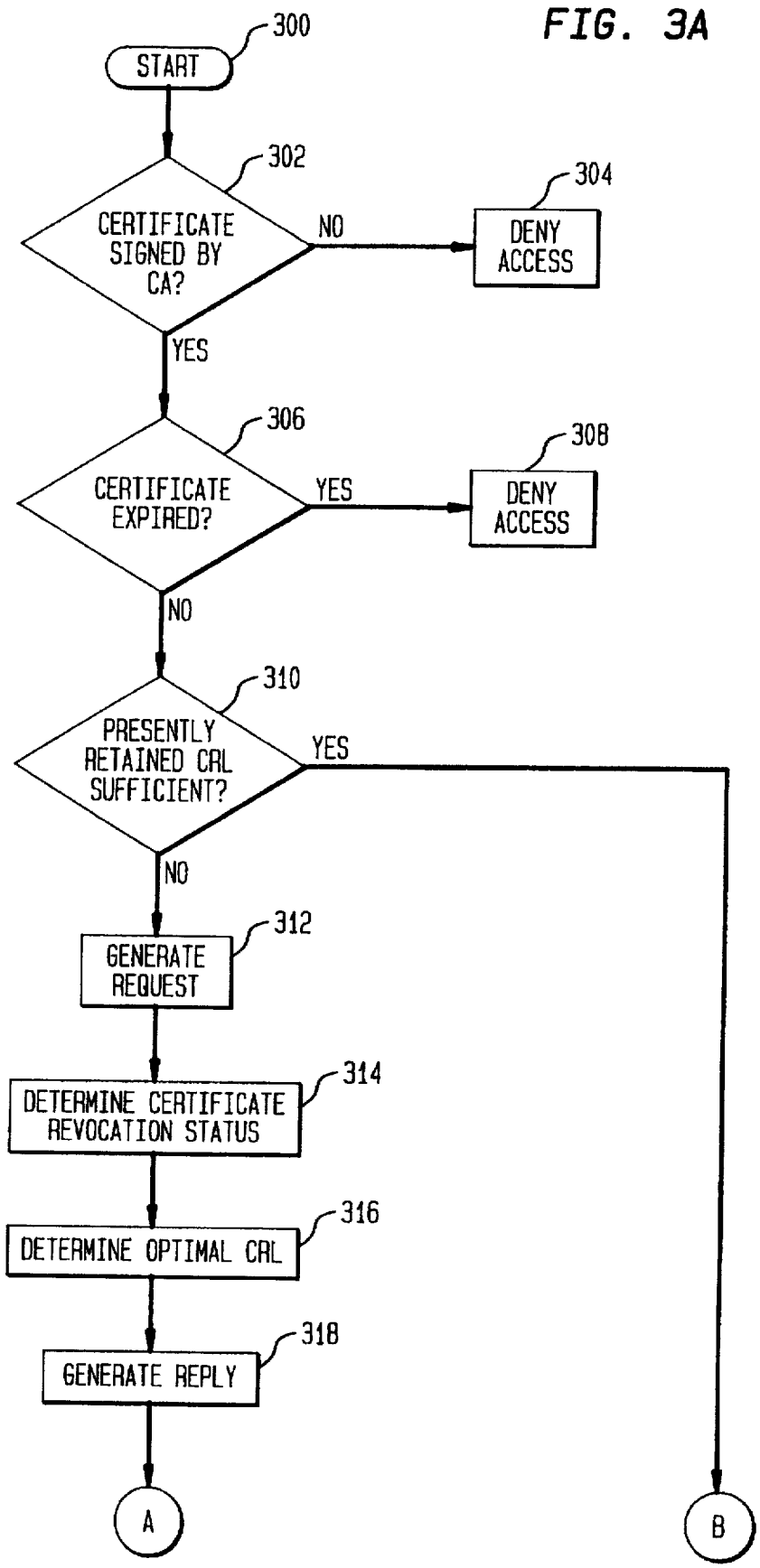
FIGS. 3A and 3B are a flowchart of the certificate revocation process of the present invention.
Figure 3B:
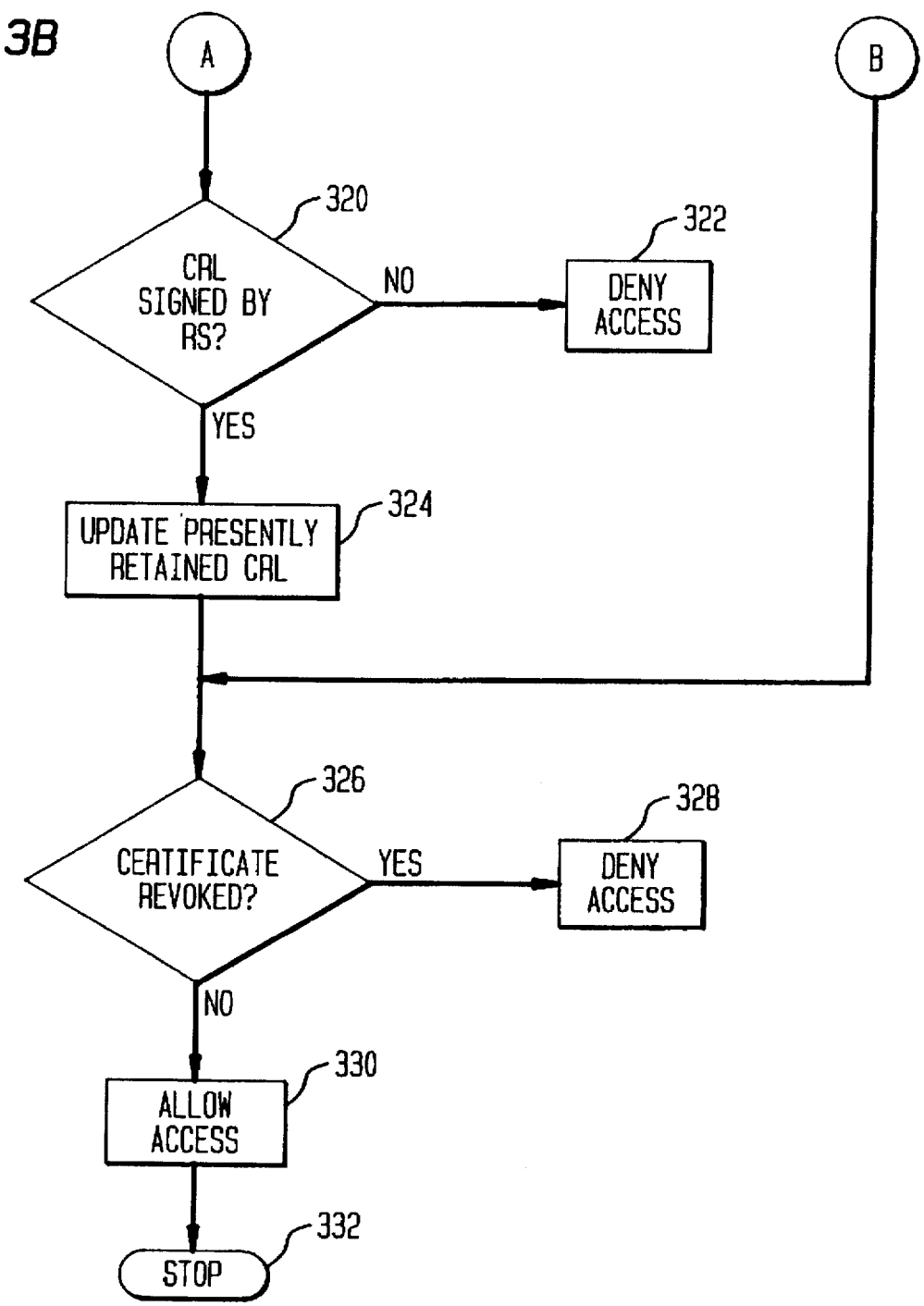

FIGS. 3A and 3B depict the certificate revocation process of the present invention performed by the server node 104, acting as a verifying principal, and the RS 210. The process starts at block 300 and proceeds to block 302, where the server node first determines whether the certificate is properly signed by the CA. In the illustrative embodiment, the server node receives the certificate from CSS 204; alternatively, server node 104 may receive the user's certificate from workstation 102 as part of the authentication exchange. In either case, the certificate is signed by the CA that generated it. If the certificate is not signed by the CA, the user is denied access to the network's resources as shown in block 304. If the certificate is properly signed by the CA, then the process continues at block 306.

As noted, associated with the certificate is an expiration date after which the certificate is no longer valid. In block 306, the server node determines whether the certificate has expired. If the certificate has expired, the server node 104 denies the workstation 102 access to its resources as shown in block 308. If the certificate has not expired, the process continues at block 310 wherein the server node examines the CRL it presently retains, if any, to determine whether the certificate has been revoked, or whether it should request the revocation status from the RS if the contents of the presently retained CRL are insufficient. If the presently retained CRL exists and is sufficiently current to maintain a desired level of security in server node 104, then the process proceeds to block 326 where it is determined if the certificate has been revoked.

Alternatively, if the server node does not presently retain a sufficiently current CRL or contains no CRL at all, the process continues at block 312 wherein the server node generates and provides the RS with a unique request regarding the revocation status of the particular certificate. In addition to soliciting the revocation status of a particular certificate, the unique request may further include a number of parameters, such as a maximum CRL size and a timestamp, for consideration by the RS 210 in determining what additional certificate revocation information, if any, to provide in its reply. The maximum CRL indicates the largest number of revoked certificate serial numbers that may be processed by, and thus transmitted to, the server node in the revocation service reply, whereas the timestamp indicates the latest certificate revocation date of the certificates included in the CRL presently retained by the server node.

It should be understood that server node 104 may also generate a request solely to update the CRL it presently retains. In other words, a request is not dependent upon the performance of a specific authentication. In this case, the unique request will not contain the serial number of a particular certificate, but will contain one or more optimization parameters. Thus, processing may begin at block 312 wherein the server node generates and provides the RS with a unique request containing only those parameters related to obtaining a CRL.

In block 318, the RS 210 generates a reply in response to the server node request that includes a revocation status of the particular certificate, if indicated in the request, and an optimal CRL. To determine the revocation status of the particular certificate, at block 314, the RS accesses the CRL storage facility 208 to determine whether the particular certificate serial number provided by the server node 104 is included in the current CRL, indicating that it has been revoked. Once this determination is made, the RS retains the revocation status until the reply is generated in block 318.

In accordance with a novel aspect of the present invention, the RS 210 performs processing block 316 wherein it determines the most efficient manner to respond to server node 104 by determining whether the optimal CRL contain all, part, or none of the current CRL revoked certificate serial numbers. If it is determined that the optimal CRL is to contain no revoked certificate serial numbers, the RS responds solely with an indication of whether the particular certificate has been revoked, thereby consuming the minimal amount of bandwidth on the network. On the other hand, the RS may include the complete current CRL in the optimal CRL portion of its rely, thus eliminating the need for the server node to communicate with the RS to confirm the revocation status of future certificates, at least for as along as the server node considers the current CRL to be valid. As noted, the current CRL validity period is an application-dependent period of time after which the current CRL is no longer considered likely to contain a complete list of revoked certificates that jeopardizes the security of the server node. Determination of the optimal CRL entails consideration of any number of optimization factors, including the number of revoked certificates stored in the CRL storage facility and the time remaining before the RS expects to receive an updated CRL from the CA, along with the maximum CRL size and timestamp parameters provided to the RS in the server node request.

In a preferred embodiment, the RS determines the optimal CRL based upon the maximum CRL size as well as the size and expected update time of the current CRL. For example, when the CRL is short and will not be updated by the CA in the near future, the RS will provide the CRL to the server node if it is less than or equal to the maximum CRL size that the server node can process. Here, the additional bandwidth consumed by sending the current CRL, with the revocation status of the particular certificate, if any, is less than the anticipated bandwidth consumed by the server node requesting the revocation slams of additional certificates during the remaining time before the CRL is updated. On the other hand, when the CRL is long, or when the current CRL is expected to be updated shortly, the RS will simply respond with the revocation status of the particular certificate (if one is requested). In this latter case, the consumed bandwidth cannot be justified by the few anticipated revocation requests that are precluded by sending the complete current CRL.

Advantageously, a server node 104 decides whether it will receive an optimal CRL with the certificate revocation status regardless of whether it presently possesses an expired CRL. For example, a server node may not currently have sufficient capacity to update its presently retained CRL. Under this condition, requesting only the revocation status of the particular certificate enables the server node to postpone processing of the optimal CRL until it can efficiently dedicate the necessary resources. Another example is a server node that does not locally store a CRL due to it infrequently performing an authentication exchange. In such circumstances, the server node will always request only the revocation shams of the particular certificate being authenticated. Server node control over the size and contents of the optimal CRL may be performed in any number of ways. For example, a server node may include in its request a timestamp having a value set to the present time, which will be interpreted by the RS that the server node presently retains the current CRL. Alternatively, the server node may set the acceptable CRL size to zero, which will be interpreted by the RS that the server node cannot accept any revoked certificate serial numbers with the revocation status.

In another preferred embodiment of the present invention, the RS generates the optimal CRL containing only a portion of the current CRL. Determination of this "incremental" CRL is based upon the same factors as discussed in the first preferred embodiment, as well as the timestamp date provided by the server node in its request. As noted, the timestamp indicates the latest certificate revocation date of the certificates included in the CRL presently retained by the server node. Here, the RS provides the server node with only the serial numbers of those certificates which have been revoked since the date indicated in the timestamp. The server node appends these serial numbers to the CRL it presently retains, resulting in a complete list of currently revoked certificates. If no additional certificates have a revocation date later than the timestamp date, then the CRL presently retained by the server node contains all the unexpired certificates of the current CRL stored in the CRL storage facility 208. Thus, the RS only responds with the revocation status of the particular certificate if one was indicated in the serve node request.

As noted above, the CA provides the scheduled expiration date of the certificate along with the serial number to the CRL storage facility 208. The expiration date is provided to the server node by the RS along with the certificate serial number in its reply. Using the certificate expiration date, the recipient server node may discard revoked certificates sometime after their expiration date has passed. This enables each server node to retain only those revoked certificate serial numbers pertinent to its security needs.

In another preferred embodiment of the invention, the timestamp date is considered in combination with the maximum CRL size in determining which portion of the current CRL to include in the incremental CRL. If the RS determines that the number of revoked certificates that it must provide to the server node is greater than the maximum CRL size, the RS provides incremental CRLs in successive replies, each including certificates that have revocation dates in successive date ranges. The server node continually appends the contents of each successive incremental CRL to attain the current CRL. The server node indicates the last revoked certificate via the timestamp field while the RS informs the server node of the revoked certificates in its reply via the CRL issue date.

If the server node was required to determine the validity of a different certificate during the above incremental update of the server node CRL, the server node could not rely on the CRL it presently retained since it would not be complete, and would have to send a request to the RS. Eventually, however, the server node would obtain all revoked certificates from the RS and would thereafter forego the request process, at least until the current CRL is not longer considered valid.

Similar to the above embodiment wherein incremental CRLs are provided to the server node, the recipient node is capable of discarding expired certificates which no longer need to be included in the CRL that that server node retains using the scheduled expiration date of the certificate. As one skilled in the art would find apparent, the discarding of expired certificates may also be performed by the RS.

It should be noted that this preferred embodiment provides greater flexibility than the above embodiments by considering the greater number of optimization factors. This greater flexibility enables the RS and server node to more accurately refine the certificate revocation process to existing conditions. Additionally, this embodiment provides the server node with the more control over the process since the server node provides a greater number of parameters considered by the RS.

It should also be noted that other optimization factors may be considered in combination with any of the above embodiments to efficiently provide a verifying server node with certificate revocation information. For example, the RS may also consider the present traffic on the network in determining its response. If there is traffic presently on the network, then the RS may respond solely with the revocation status for the particular certificate. Conversely, if the network activity is minimal, then the RS will include the optimal CRL to the server node in its reply.

Once the optimal CRL is determined, the revocation server generates its signed reply in block 318. Upon receipt, the process proceeds at block 320 where the server node verifies that the received CRL is signed by the RS. If not, then the server node denies access to its resources in block 322 and ignores the RS's reply. Otherwise, the server node supplements its presently retained CRL, if any, with the revoked certificate serial number(s), revocation date, and expiration date contained in the optimal CRL in block 324. In the embodiment wherein the complete current CRL is provided to the server node, then the server node replaces the presently retained CRL with the current CRL. If an incremental CRL is provided by the RS, then those certificates are appended to the presently retained CRL as noted above.

The server node 104 then determines whether the reply indicates that the particular certificate has been revoked in block 326. As shown in FIGS. 3A and 3B, this may also occur after block 310 when the server node determines that it was not necessary to request the revocation status from the RS. In either event, if the reply indicates that the particular certificate has been revoked, then the server node will deny access to the associated principal in block 328; otherwise it shall allow access at block 330.

Advantageously, the present invention provides a flexible and efficient means for optimally providing certificate revocation information to a verifying principal, regardless of the size of the current CRL, the capabilities of the server node, the rate at which certificates are revoked in the system, and the desired level of network security. The present invention, therefore, enables the certificate revocation process to consume minimal system bandwidth.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a public key distributed network, a system for improving the efficiency of an authentication exchange among a plurality of principals interconnected by a communications medium, the system comprising:
   a verifying principal configured to request revocation information pertaining to a certificate;
   a certificate authority (CA), coupled to said verifying principal, for generating said certificate; and
   a revocation service, responsive to said verifying principal, including,
      a database configured to store a current certificate revocation list (CRL) including serial numbers of all revoked certificates in the network, and
      means for generating a reply to said request, said reply providing an optimal CRL based upon said current CRL and optimized to contain serial numbers of a predetermined number of revoked certificates in response to one or more optimization factors and an issue time for said optimal CRL,
   such that said optimal CRL includes one or more of said revoked certificate serial numbers to improve the efficiency of the authentication exchange.

2. The system of claim 1, wherein said one or more optimization factors comprises:
   a quantity of said revoked certificate serial numbers stored in said database; and an anticipated update time of said current CRL by said CA.

3. The system of claim 2, wherein said optimal CRL includes said revoked certificate serial numbers stored in said database when said quantity of said revoked certificate serial numbers is small relative to said anticipated update time of said current CRL, and further wherein said revocation service does not include said revoked certificate serial numbers in said reply when said quantity of revoked certificate serial numbers is large relative to said anticipated update time.

4. The system of claim 2, wherein said one or more optimization factors include one or more parameters provided to said revocation service by said verifying principal in said request, said one or more parameters comprising:

a maximum CRL size indicating a maximum number of certificate serial numbers said optimal CRL may include.

5. The system of claim 4, wherein said optimal CRL includes all said revoked certificates stored in said database only if said quantity of said revoked certificates is equal to or less than said maximum CRL size provided by said verifying principal.

6. The system of claim 4, wherein said one or more parameters further comprises:

a timestamp indicating an earliest acceptable revocation date for certificate serial numbers included in said optimal CRL.

7. The system of claim 6, wherein said optimal CRL is an incremental CRL including serial numbers of revoked certificates having revocation dates after said timestamp date and wherein said quantity of said serial numbers in said optimal CRL is less than or equal to said maximum CRL size, and wherein said issue time for said optimal CRL indicates a latest revocation date of said revoked certificates having a serial number included in said incremental CRL.

8. The system of claim 6, wherein said one or more optimization factors further comprises:

communications activity over the network, wherein said revocation service transmits said reply at a time when said communications activity is less likely to be impacted by said reply.

9. The system of claim 5, wherein said reply includes a value representing the quantity of said revoked certificate serial numbers when said quantity of said revoked certificate serial numbers is larger than said maximum CRL size.

10. The system of claim 1, wherein said revocation service provides a signature of said reply in said reply.

11. The system of claim 1, wherein said verifying principal appends said optimal CRL to a presently retained CRL when said optimal CRL is an incremental CRL comprising a portion of said current CRL stored in said database and further wherein said verifying principal replaces said presently retained CRL with said optimal CRL when said optimal CRL contains all of said revoked certificate serial numbers stored in said database, such that said verifying principal may thereafter refer to said retained CRL to determine if a certificate has been revoked.

12. The system of claim 2, wherein said one or more optimization factors further comprises:

communications activity over the network, wherein said revocation service transmits said reply at a time when said communications activity is less likely to be impacted by said reply.

13. A revocation service for use in a public key network system, the revocation service improving the efficiency of an authentication exchange among a plurality of principals interconnected by a communications medium, the revocation service comprising:

means for receiving a certificate revocation request from a verifying principal logically coupled with the revocation service by said communications medium;

means for storing a current certificate revocation list (CRL), said current CRL including a list of serial numbers of unexpired certificates that have been revoked; and reply means, coupled to said storing means, for generating a reply to said request, said reply including, a revocation status for it particular certificate, an optimal CRL based upon said current CRL and optimized to contain a predetermined number of revoked certificates in response to one or more optimization factors, and an issue time for said optimal CRL if said optimal CRL includes one or more revoked certificates.

14. The service of claim 13, wherein said means for storing comprises a revocation service database and wherein said one or more optimization factors comprises:

a quantity of revoked certificate serial numbers stored in said database; and an anticipated certificate authority (CA) update time of said current CRL stored in said database.

15. The service of claim 14, wherein said optimal CRL includes said revoked certificate serial numbers stored in said database when said quantity of said revoked certificate serial numbers is small relative to the anticipated occurrence of said current CRL update by said CA, and further wherein said revocation service does not include said revoked certificate serial numbers in said reply when said quantity of revoked certificate serial numbers is large relative to said anticipated update of said current CRL.

16. The service of claim 14, wherein said one or more optimization factors include one or more parameters provided by said verifying principal in said request, said parameters comprising:

a maximum CRL size indicating a maximum number of certificate serial numbers said optimal CRL may include, wherein said optimal CRL includes all said revoked certificates stored in said database only if said quantity of said revoked certificates is equal to or less than said maximum CRL size provided by said verifying principal.

17. The service of claim 16, wherein said reply includes a value representing quantity of said revoked certificate serial numbers when said quantity of said revoked certificate serial numbers is larger than said maximum CRL size.

18. The service of claim 16, wherein said one or more parameters further comprises:

a timestamp indicating an earliest acceptable revocation date for certificate serial numbers included in said optimal CRL, wherein said optimal CRL is an incremental CRL including serial numbers of revoked certificates having revocation dates after said timestamp date and wherein said quantity of said serial numbers in said optimal CRL is less than or equal to said maximum CRL size, and wherein said issue time for said optimal CRL indicates a latest revocation date of said revoked certificates having a serial number included in said incremental CRL.

19. The service of claim 13, wherein said verifying principal appends said optimal CRL to a presently retained CRL when said optimal CRL is an incremental CRL comprising a portion of said current CRL stored in a database and further wherein said verifying principal replaces said presently retained CRL with said optimal CRL when said optimal CRL contains all of said revoked certificate serial numbers stored in said database, such that said verifying principal may thereafter refer to said retained CRL to determine if a certificate has been revoked.

20. The service of claim 13, wherein said one or more optimization factors further comprises:

communications activity over the network, wherein said revocation service transmits said reply at a time when said communications activity is less likely to be impacted by said reply.

21. The service of claim 13, wherein said certificate revocation request further comprises a status request identifying a particular certificate, and wherein said reply means further comprises a revocation status for said particular certificate.

22. A revocation service for use in a public key network system, the revocation service improving the efficiency of an authentication exchange among a plurality of principals interconnected by a communications medium, the revocation service comprising:

means for receiving a certificate revocation request from a verifying principal logically coupled with the revocation service by said communications medium;

means for storing a current certificate revocation list (CRL) of serial numbers of unexpired certificates that have been revoked; and means for constructing and signing a reply to said request, said reply including, an optimal based upon said current CRL and optimized to contain a predetermined number of revoked certificates in response to one or more optimization factors including one or more parameters, and an issue time for said optimal CRL if said optimal CRL includes one or more revoked certificates.

23. The service of claim 22, wherein said certificate revocation request comprises said one or more parameters, including a maximum CRL size indicating a maximum number of certificate serial numbers said verifying principal can process, and a timestamp indicating a latest revocation date of certificate serial numbers retained by said verifying principal.

24. The service of claim 23, wherein said verifying principal appends said optimal CRL to said retained certificate serial numbers when said optimal CRL is an incremental CRL comprising a portion of said current CRL stored in said database and further wherein said verifying principal replaces said retained certificate serial numbers with said optimal CRL when said optimal CRL contains all of said revoked certificate serial numbers stored in said database, such that said verifying principal may thereafter refer to said optimal CRL to determine if a certificate has been revoked.

25. The service of claim 23, wherein said optimal CRL is an incremental CRL including serial numbers of revoked certificates having revocation dates after said timestamp date and wherein a quantity of said serial numbers in said optimal CRL is less than or equal to said maximum CRL size, and wherein said issue time for said optimal CRL indicates a latest revocation date of said revoked certificates having a serial number included in said incremental CRL.

26. The system of claim 1, wherein said database is further configured to store a certificate expiration date with each said serial number of said revoked certificates, and wherein said generating means includes said expiration date with each of said revoked certificate serial numbers in said reply, and wherein said verifying principal discards said serial numbers of said revoked certificates after said expiration date has passed.

27. The system of claim 1, wherein said database is further configured to store a scheduled expiration date with each said serial number of said revoked certificates, and wherein said generating means excludes from said optimal CRL one or more certificate serial numbers having an associated expiration date that has passed.

28. The system of claim 10, wherein said verifying principal stores said signature of said reply.

29. The service of claim 13, wherein said optimal CRL further includes an expiration date with each said revoked serial numbers, and wherein said reply means further includes said expiration date in said reply.

30. The service of claim 29, wherein the verifying principal discards said serial numbers of said revoked certificates after said expiration date has passed.

31. The service of claim 29, wherein the reply means discards said serial numbers of said revoked certificates after said expiration date has passed.

32. The service of claim 22, wherein said optimal CRL further includes an expiration date of said serial number with each said serial number, and wherein said verifying principal discards said serial numbers of said revoked certificates after said expiration date has passed.

* * * * *